United States Patent
Foster et al.

(10) Patent No.: US 10,201,127 B2
(45) Date of Patent: Feb. 12, 2019

(54) AIR ASSISTED THRESHER

(71) Applicants: Gerald A Foster, Sunnybrook (CA);
Dale W MacKenzie, Thorsby (CA)

(72) Inventors: Gerald A Foster, Sunnybrook (CA);
Dale W MacKenzie, Thorsby (CA)

(73) Assignee: Sunnybrook Welding & Machine Shop Ltd., Sunnybrook, Alberta (CA)

( * ) Notice: Subject to any disclaimer, the term of this patent is extended or adjusted under 35 U.S.C. 154(b) by 0 days.

(21) Appl. No.: 15/489,508

(22) Filed: Apr. 17, 2017

(65) Prior Publication Data
US 2017/0295723 A1 Oct. 19, 2017

Related U.S. Application Data

(60) Provisional application No. 62/323,237, filed on Apr. 15, 2016.

(51) Int. Cl.
*A01F 7/06* (2006.01)
*A01D 41/12* (2006.01)
*A01F 12/48* (2006.01)

(52) U.S. Cl.
CPC .......... *A01F 7/067* (2013.01); *A01D 41/1243* (2013.01); *A01F 12/48* (2013.01)

(58) Field of Classification Search
CPC ..... A01D 75/187; A01D 41/1243; A01F 7/06; A01F 7/067; A01F 12/16; A01F 12/18; A01F 12/444; A01F 12/182; A01F 12/442; A01F 12/48
USPC ............... 460/67, 80, 99, 100, 105; 56/14.6; 415/53.1, 53.2
See application file for complete search history.

(56) References Cited

U.S. PATENT DOCUMENTS

| | | | |
|---|---|---|---|
| 117,812 A | 8/1871 | Praff | |
| 752,182 A | 2/1904 | Ross et al. | |
| 772,402 A | 10/1904 | Carter | |
| 876,681 A | 1/1908 | Batke et al. | |
| 1,184,999 A | 5/1916 | Reason | |
| 1,357,275 A | 11/1920 | Clay | |
| 1,831,216 A | 11/1931 | Wickersham | |
| 2,053,148 A | 9/1936 | James | |
| 2,826,204 A | 3/1958 | Miller | |
| 3,103,932 A | 9/1963 | Buchele | |
| 3,808,780 A | 5/1974 | Wood | |
| 4,208,858 A * | 6/1980 | Rowland-Hill | A01F 7/06 460/100 |
| 4,284,086 A | 8/1981 | Williams | |
| 4,869,272 A * | 9/1989 | Ricketts | A01F 7/06 460/100 |
| 5,045,025 A | 9/1991 | Underwood | |
| 5,562,540 A * | 10/1996 | Balmer | A01F 7/06 460/65 |
| 7,731,577 B2 * | 6/2010 | Ricketts | A01F 12/444 415/53.1 |

(Continued)

*Primary Examiner* — Robert E Pezzuto
(74) *Attorney, Agent, or Firm* — Davis & Bujold PLLC; Michael J. Bujold

(57) ABSTRACT

A thresher for a combine harvester has a concave cage and a rotor disposed within the concave cage. The rotor carries material manipulators that extend outward from the rotor toward the cage to manipulate material in the concave cage as the rotor rotates. One or more air nozzles are provided that direct air outward from the rotor and toward the concave cage. A source of forced air circulates air through the one or more air nozzles.

19 Claims, 4 Drawing Sheets

(56) References Cited

U.S. PATENT DOCUMENTS

| | | | |
|---|---|---|---|
| 8,920,226 B2 * | 12/2014 | Duquesne | A01D 75/187 460/105 |
| 2015/0065212 A1 | 3/2015 | Kvist | |

* cited by examiner

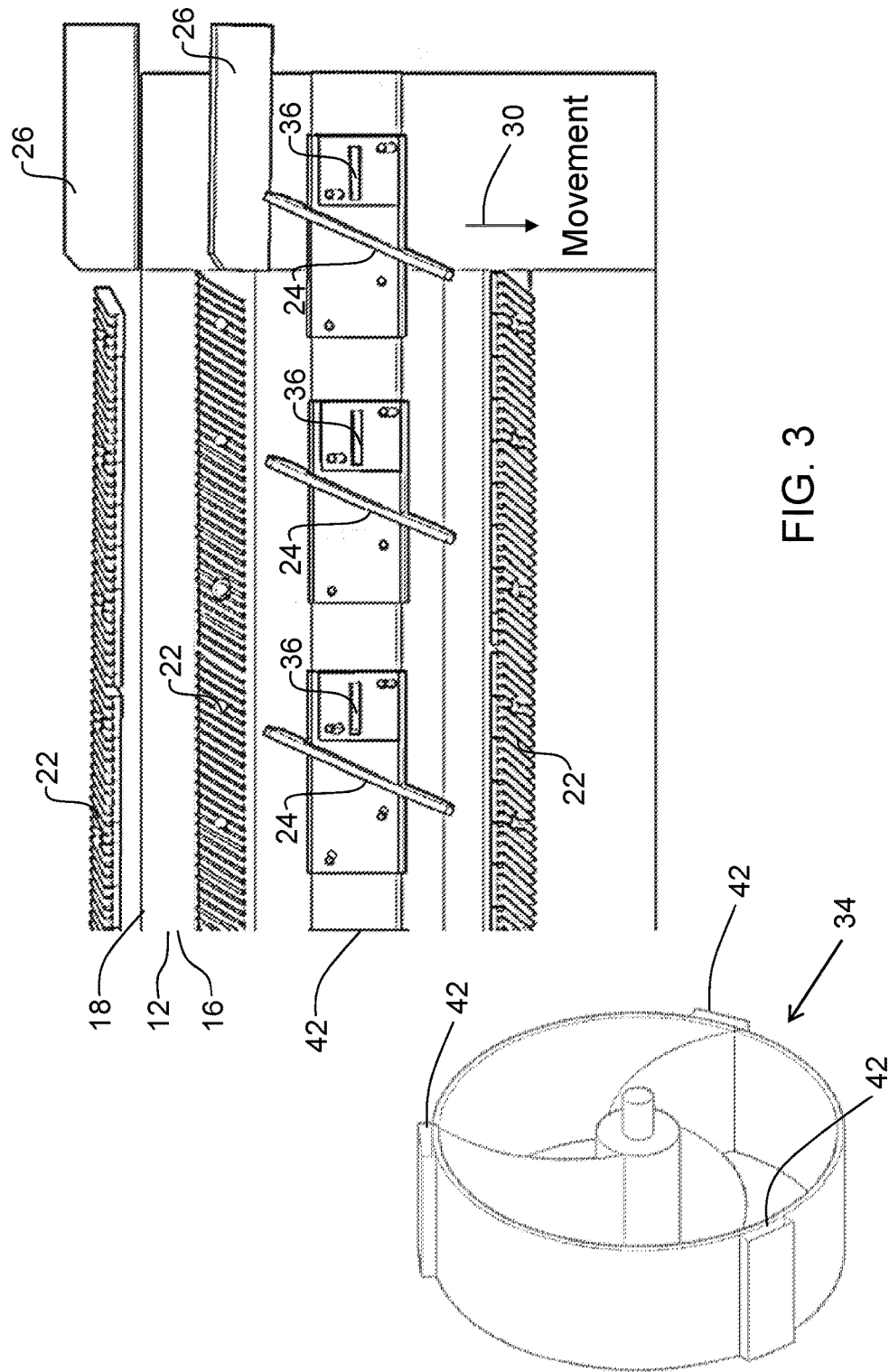

AIR ASSISTED THRESHER

TECHNICAL FIELD

This relates to a thresher used in a rotary-type combine harvester with air nozzles that assist in threshing the grain.

BACKGROUND

Combine harvesters, or combines, are used to reap, thresh, and winnow or separate grain crops. In the threshing process, the grain is separated from the chaff, and in the separation process, the grain and chaff are separated into separate streams. In one common type of combine harvester, a rotor that carries devices to assist in separation, such as rasp bars and blades, sweep, etc., and rotates within a concave grating. The rasp bars help loosen and begin separating the grain from the chaff as it is pushed through the grating.

In order to increase capacity, rotary combines continue to add increasingly larger engines. However, there are limits to the ability to increase capacity in this way given the geometric shape of the machines due to road travel weight and size restrictions.

SUMMARY

According to an aspect, there is provided a thresher for a combine harvester, comprising a concave cage, and a rotor comprising a cylindrical body having an outer surface, the rotor being disposed within the concave cage and rotating in a first direction about an axis of rotation. The rotor comprises material manipulators carried by the rotor, the material manipulators extending outward from the outer surface of the cylindrical body toward the cage to manipulate material in the concave cage as the rotor rotates. The rotor further comprises one or more air nozzles that direct air outward from the rotor and toward the concave cage, and a source of forced air, such as axial and centrifugal fans in series, that circulates air through the or more air nozzles.

According to other aspects, thresher may comprise one or more of the following aspects, alone or in combination: the material manipulators may have a leading surface that is angled relative to the axis of rotation such that the plates have a leading surface that leads the material manipulator as the rotor rotates in the first direction; the one or more air nozzles may be adjacent to one or more material manipulators, and may be adjacent to the leading surface of one or more material manipulators; the cylindrical body may define an inner cavity in fluid communication with the one or more air nozzles and the source of forced air comprises one or more blowers that draws air into the inner cavity; the material manipulators may be mounted to a channel that is raised above the outer surface of the cylindrical body, where the channel may act as an air conduit between the source of forced air and the one or more air nozzles and the one or more air nozzles may comprise one or more openings in the channel; and the cylindrical body may comprise openings at both ends to receive air.

According to another aspect, there is provided a combine harvester, comprising a reaping section that reaps grain crops; a threshing section as described above that receives the grain crops from the reaping section; and a separator section that receives separated grain crops from the threshing section and separates the grain from the chaff.

According to another aspect, there is provided a method of threshing grain, comprising the step of providing a thresher or combine harvester as described above; and rotating the rotor within the concave cage and circulating air through the one or more nozzles.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 2 is a perspective view of a fan in the end of the cylinder.

FIG. 3 is a side elevation view of a cylinder.

DETAILED DESCRIPTION

Figure 6:
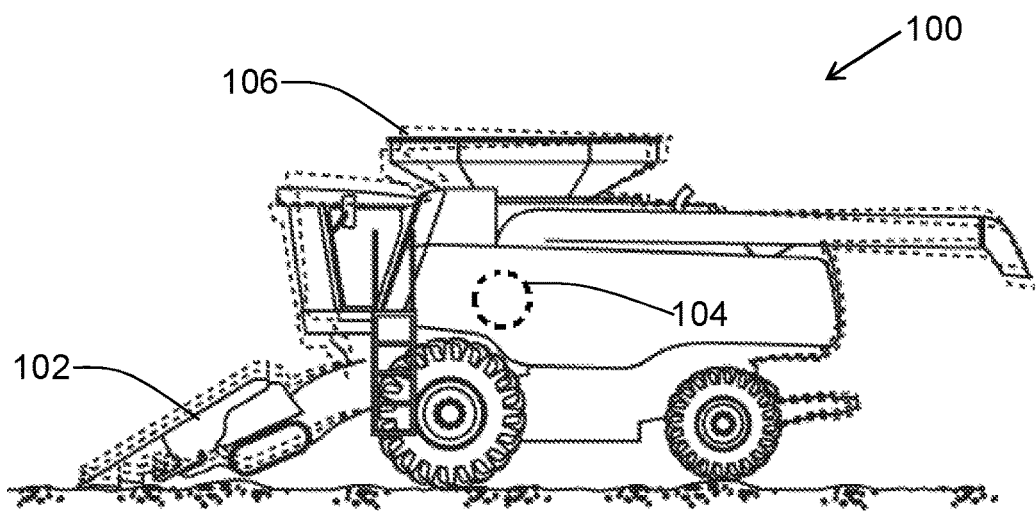
FIG. 6 is a schematic of a combine harvester.

Referring to FIG. 6, there is shown an example of a rotary combine 100 that includes a reaper section 102, a thresher section 104, and a separator section 106, each of which are identified generally. Combine 100 is used to reap a crop, then thresh and separate grain from chaff or other material.

A rotary thresher with air assist, generally identified by reference numeral 10, will now be described with reference to FIG. 1 through 5. Rotary thresher 10 discussed below may be incorporated into the thresher section 104 of combine 100, but may be used or adapted for use in other types of machinery that may use a rotary thresher.

Figure 1:
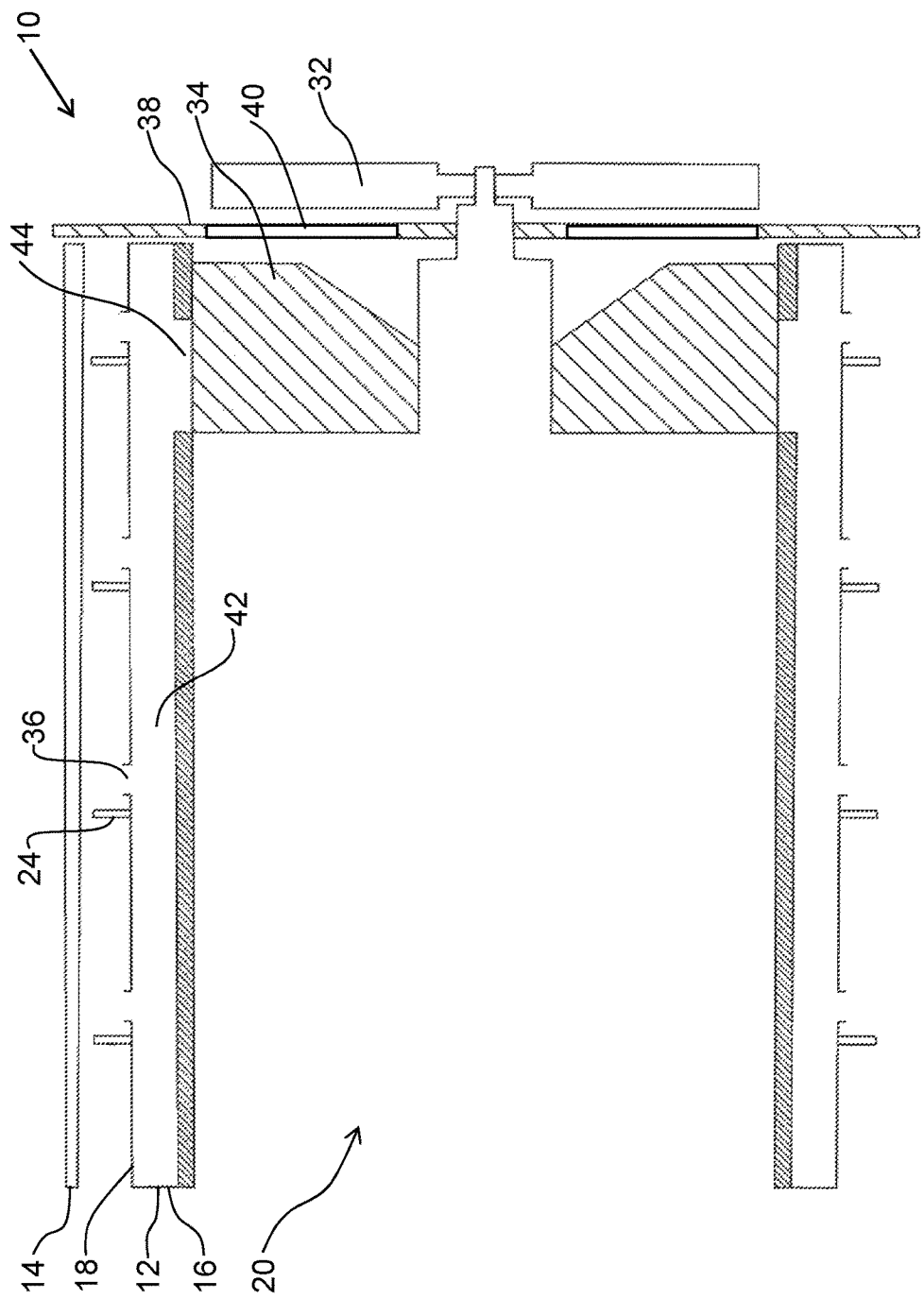
FIG. 1 is a side elevation view in section of one end of a cylinder in a cage of a rotary combine representing the air flow.
Figure 4:
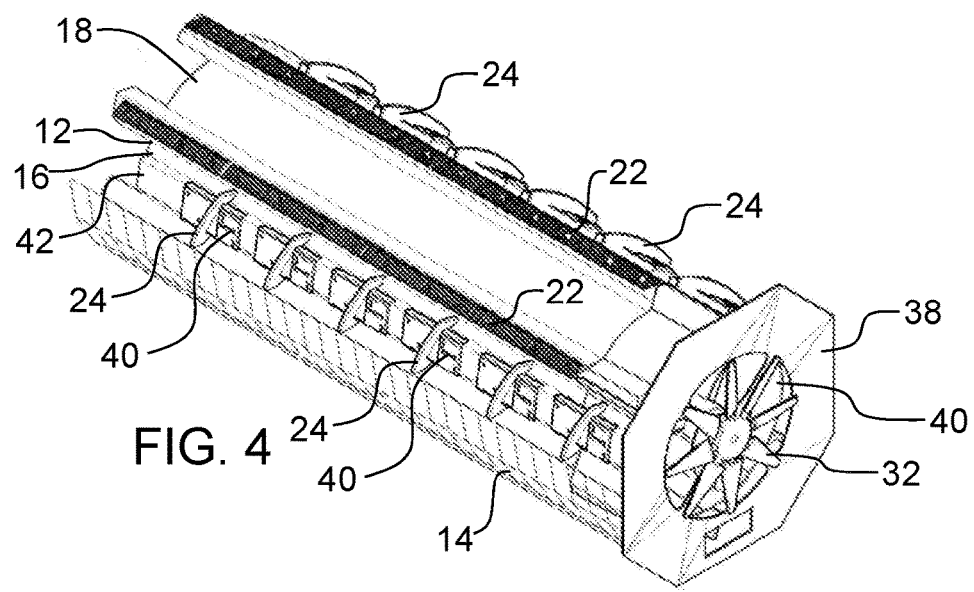
FIG. 4 is a perspective view of a cylinder with air flow.
Figure 5:
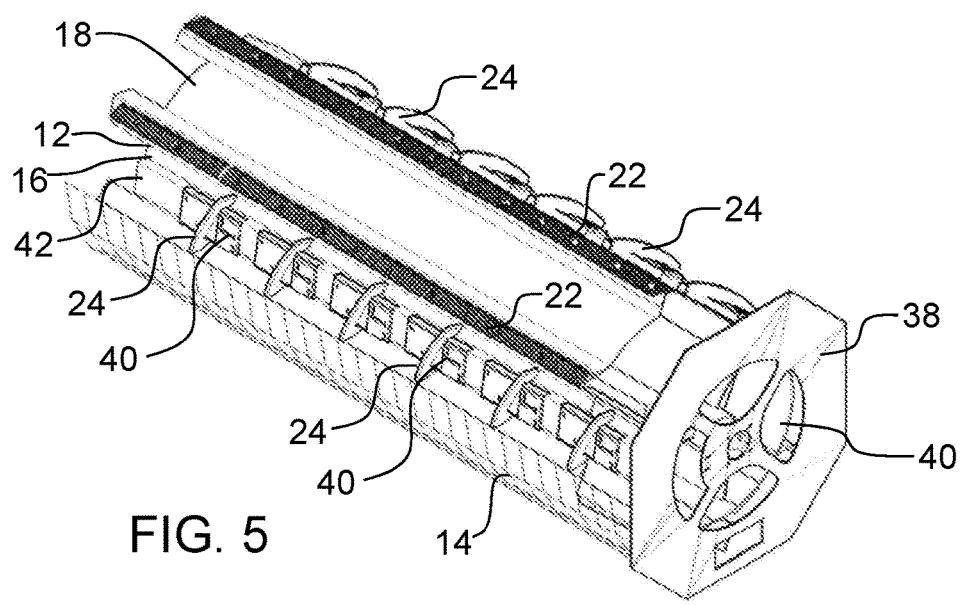
FIG. 5 is a perspective view of a cylinder with air flow with the end fan removed.

Referring to FIG. 1, rotary thresher 10 is used to thresh and separate grain from other material that accompanies the grain, such as stalks, husks, etc. Rotary thresher 10 includes a cylindrical rotating body, or rotor 12, that rotates within a concave cage 14 about a central axis. The cage 14 and rotor 12 may be any suitable design as is known in the art. Common designs typically have an outer diameter of between 20-35 inches, and are designed to rotate between 300-1000 rpm. An example of a suitable cage 14 and rotor 12 is shown in FIGS. 4 and 5. Referring to FIG. 1, rotor 12 has a cylindrical body 16 with an outer surface 18, and an inner cavity 20. Outer surface 18 of rotor 12 carries various devices and tools to assist in the separation of grain from the extra organic material. Aside from those necessary to implement the effect discussed herein, these devices and tools may be modified as is known in the art. Referring to FIG. 3, the devices and tools may include rasp bars 22, sweeps 24, discharge paddles 26, and blades or knives (not shown), each of which extends out to, or at least toward, cage 14. As rotor 12 rotates, these tools will engage the material and improve separation by manipulating the material in different ways. Generally speaking, the material manipulators have a leading surface that is angled relative to the axis of rotation to move the material in a particular direction, represented by arrow 30. As rotor 12 rotates, a vacuum is created behind sweeps 24, and an increase in pressure in front of sweeps 24. The pressure and airflow in front of sweeps 24 is modified by the air pressure exiting nozzles 36. The specifications, such as size, shape, angle, spacing, etc. may be designed or modified by those skilled in the art.

Referring to FIG. 4, air is delivered into one end of rotor 12 by a blower, depicted as an axial fan 32, to be directed and controlled to assist separation from within rotor 12. It will be understood that air may be delivered at both ends if preferred. Referring to FIG. 1, two blowers 32 and 34 are shown, where blower 32 is located outside end wall 38 to draw air into rotor 12, while blower 34 is located within rotor 12 and directs air radially outward into channels 42. Blowers 32 and 34 may be powered by any suitable means, as will be understood by those skilled in the art. Blowers 32 and 34 may also be mounted in any suitable manner. For example, blower 32 is attached to a rotor stub shaft outside end wall 38, while blower 34 is located within a sidewall (not shown) attached inside end wall 38 that is sufficiently strong to support blower 34, while remaining open as much as possible to permit blower 34 to deliver air into channels 42.

Referring to FIG. 1, rotor 12 is designed to supply nozzles 36 on outer surface 18 of rotor 12 with air by connecting nozzles 34 to a supply of pressurized air. In the depicted example, this is done by opening cavity 20 within cylindrical body 16 of rotor 12, such that air may be introduced and moved therein by blowers 32 and 34. A first blower, shown as an axial fan 32 draws air into cylinder 16, and a second blower, shown as a centrifugal fan 34, directs the air outward such that it flows toward nozzles 36. Referring to FIG. 4, axial fan 32 may be outside an end wall 38 of cylindrical body 16, which, referring to FIG. 5, has openings 40 to allow the air to enter cavity 20 of cylinder 16. If one starts from the design of a known type of rotor 12, this may be achieved by modifying or replacing an existing end wall to have openings 40. After entering cavity 20, air may be redirected outward by a centrifugal fan 34 toward nozzles 36, which are spaced along cylinder 16, and are shown as being connected to cavity 20 by channels 42. While a single blower could be used, the use of two blowers 32 and 34 allows a higher degree of control over the air flow, and allows lower horsepower blowers to be used. It will be understood, of course, that various strategies may be used to supply nozzles 36 with air through rotor 12, including the use of the desired number, style and placement of blowers 32 and/or 34, or by using a different source of pressurized air in communication with rotor 12. For example, cylinder 16 may be open at both ends to increase the amount of air available to be drawn into cylinder 16. Alternatively, there may be flow control devices to control the air pressure from nozzles 36, such as by making openings 40 in end plate 38 or from cavity 20 to channels 42 adjustable, fan speed, etc.

Referring to FIG. 1, in the depicted example, air flows from inner cavity 20 of cylinder 16 into channels 42, which may flow along all or a portion of the length of cylinder 16. As shown, channels 42 are formed using channel iron on outer surface 18 of rotor 12, and are connected to cavity 20 by channel openings 44 that are fed air by second blower 34. Cylinder 16 may be modified to allow air to flow from inner cavity 20 of cylinder 16 into channels 42, and nozzles 36 may then be formed as part of channels 42 used to supply nozzles 36 with air. Preferably, the air pressure is sufficient to supply each nozzle 36 with a similar amount of pressure, although some loss of pressure may be expected as the air flow moves along channels 42 away from second blower 34. As the grain is separated from the other material, it will exit thresher 10 according to known principles used in known designs.

Referring to FIG. 3, as shown, nozzles 36 are slots that are cut in front of the leading surface of a sweep 24, and act to apply a shear force to the material being threshed as rotor 12 rotates. Nozzles 36 may also be placed in other advantageous locations, may have other shapes or angles relative to the direction of rotation, or may be used with other types of material manipulators that may be carried by rotor 12. It is believed that nozzles 36 may be beneficially placed by sweeps 24, as the primary purpose of sweeps 24 is to move material along cylinder 16, and that the shear force applied by the air from nozzles 36 may be beneficial when used in connection with this purpose.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A thresher for a combine harvester, comprising:
    a concave cage;
    a rotor comprising a cylindrical body having an outer surface, the rotor being disposed within the concave cage and rotating in a first direction about an axis of rotation, the rotor comprising:
        material manipulators carried by the rotor, the material manipulators extending outward from the outer surface of the cylindrical body toward the cage to manipulate material in the concave cage as the rotor rotates,
        at least one air nozzle directing air outward from the rotor and toward the concave cage; and
        a source of forced air that circulates air through the at least one air nozzle.

2. The thresher of claim 1, wherein the at least one air nozzle positioned adjacent to at least one of the one material manipulators.

3. The thresher of claim 1, wherein at least one of the material manipulators comprises a leading surface that is angled relative to the axis of rotation such that the a leading surface that leads the at leas one of the material manipulators as the rotor rotates in the first direction, and at least one air nozzle is adjacent to the leading surface of the at least one of the material manipulators.

4. The thresher of claim 1, wherein the cylindrical body defines an inner cavity in fluid communication with the at least one air nozzle and the source of forced air comprises at least one blower that draws air into the inner cavity.

5. The thresher of claim 1, wherein the material manipulators are mounted to a channel that is raised above the outer surface of the cylindrical body.

6. The thresher of claim 5, wherein the channel acts as an air conduit between the source of forced air and the at least one air nozzle.

7. The thresher of claim 5, wherein the at least one air nozzle comprises at least one opening in the channel.

8. A combine harvester, comprising:
    a reaping section that reaps grain crops;
    a threshing section comprising a thresher, the thresher comprising:
        a concave cage that receives the reaped grain crops from the reaping section;
        a rotor comprising a cylindrical body having an outer surface, the rotor being disposed within the concave cage and rotating in a first direction about an axis of rotation, the rotor comprising:

material manipulators carried by the rotor, the material manipulators extending outward from the outer surface of the cylindrical body toward the cage to manipulate material in the concave cage as the rotor rotates, at least one air nozzle directing air outward from the rotor and toward the concave cage; and a source of forced air that circulates air through the at least one air nozzle; and a separator section that receives separated grain crops from the threshing section and separates the grain from the chaff.

9. The combine harvester of claim 8, wherein the at least one air nozzle is positioned adjacent to at least one of the material manipulators.

10. The combine harvester of claim 8, wherein at least one of the material manipulators comprises a leading surface that is angled relative to the axis of rotation such that leading surface leads the at least one of the material manipulators as the rotor rotates in the first direction, and at least on air nozzle is adjacent to the leading surface of the at least one of the material manipulators.

11. The combine harvester of claim 8, wherein the cylindrical body defines an inner cavity in fluid communication with the at least one air nozzle and the source of forced air comprises at least one blower that draws air into the inner cavity.

12. The combine harvester of claim 8, wherein the material manipulators are mounted to a channel that is raised above the outer surface of the cylindrical body.

13. The combine harvester of claim 12, wherein the channel acts as an air conduit between the source of forced air and the at least one air nozzle.

14. A method of threshing grain, comprising the step of: providing a thresher comprising:
a concave cage;
a rotor comprising a cylindrical body having an outer surface, the rotor being disposed within the concave cage and rotating in a first direction about an axis of rotation, the rotor comprising:
material manipulators carried by the rotor, the material manipulators extending outward from the outer surface of the cylindrical body toward the cage to manipulate material in the concave cage as the rotor rotates;
at least one air nozzle directing air outward from the rotor and toward the concave cage; and
a source of forced air that circulates air through the at least one air nozzle receiving reaped grain crops between the concave cage and the rotor; and rotating the rotor within the concave cage and circulating air through the at least one air nozzle to separate grain from the reaped grain crops.

15. The method of claim 14, wherein the at least one air nozzle is positioned adjacent to at least one of the material manipulators.

16. The method of claim 14, wherein the material manipulators comprise a leading surface that is angled relative to the axis of rotation such that the leading surface leads the material manipulator as the rotor rotates in the first direction, and the at least one air nozzle is adjacent to the leading surface of at least one of the material manipulators.

17. The method of claim 14, wherein the cylindrical body defines an inner cavity in fluid communication with the at least one air nozzle and the source of forced air comprises at least one blower that draws air into the inner cavity.

18. The method of claim 14, wherein the material manipulators are mounted to a channel that is raised above the outer surface of the cylindrical body.

19. The method of claim 18, wherein the channel acts as an air conduit between the source of forced air and the at least one air nozzle.

* * * * *